US010451125B2

(12) United States Patent
Pietron et al.

(10) Patent No.: US 10,451,125 B2
(45) Date of Patent: Oct. 22, 2019

(54) VEHICLE TRANSMISSION CLUTCH ENGAGEMENT CONTROL SYSTEM

(71) Applicant: FORD GLOBAL TECHNOLOGIES, LLC, Dearborn, MI (US)

(72) Inventors: Gregory Michael Pietron, Canton, MI (US); Qi Wang, Novi, MI (US); Yuji Fujii, Ann Arbor, MI (US); Rohit Hippalgaonkar, Farmington Hills, MI (US); Joseph F. Kucharski, Livonia, MI (US); Jason Meyer, Canton, MI (US); Stuart N. Ford, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 160 days.

(21) Appl. No.: 15/674,788

(22) Filed: Aug. 11, 2017

(65) Prior Publication Data

US 2019/0048947 A1    Feb. 14, 2019

(51) Int. Cl.

| F16D 48/06 | (2006.01) |
|---|---|
| F16D 21/00 | (2006.01) |
| F16D 13/38 | (2006.01) |
| F16H 59/68 | (2006.01) |
| F16H 61/06 | (2006.01) |

(52) U.S. Cl.
CPC ............ *F16D 48/06* (2013.01); *F16D 21/00* (2013.01); *F16D 13/385* (2013.01); *F16D 2500/1045* (2013.01); *F16D 2500/10412* (2013.01); *F16D 2500/30806* (2013.01); *F16D 2500/50245* (2013.01)

(58) Field of Classification Search
CPC ........ F16D 48/06; F16D 21/00; F16D 13/385; F16D 2500/10412; F16D 2500/1045; F16D 2500/30806; F16D 2500/50245; F16H 2059/683; F16H 61/06; F16H 2061/064
See application file for complete search history.

(56) References Cited

U.S. PATENT DOCUMENTS

| 6,742,639 | B2 * | 6/2004 | Aikawa | F16H 61/061 |
|---|---|---|---|---|
| | | | | 192/3.61 |
| 7,775,338 | B2 * | 8/2010 | Yoshida | F16D 25/123 |
| | | | | 184/6.12 |
| 8,414,449 | B2 | 4/2013 | Heap et al. | |
| 8,509,979 | B2 * | 8/2013 | Kanno | B60L 50/16 |
| | | | | 701/22 |
| 8,777,803 | B2 | 7/2014 | McGrogan et al. | |
| 8,939,340 | B2 | 1/2015 | Teslak et al. | |
| 9,174,639 | B2 | 11/2015 | Ryu et al. | |

* cited by examiner

*Primary Examiner* — Tinh T Dang
(74) *Attorney, Agent, or Firm* — David Kelley; Brooks Kushman P.C.

(57) ABSTRACT

A vehicle includes a transmission and a controller. The transmission has clutches that are configured to establish multiple speed ratios, including a first clutch. The first clutch has a measured drag torque distribution. The measured drag torque distribution has a median and a standard deviation. The controller is programmed to increase a pressure at a rate to engage the first clutch and to increase the rate in response to a measured first clutch torque exceeding the median by a predetermined multiple of the standard deviation.

20 Claims, 5 Drawing Sheets

VEHICLE TRANSMISSION CLUTCH ENGAGEMENT CONTROL SYSTEM

TECHNICAL FIELD

This disclosure relates to systems for controlling clutches in an automatic transmission during an engagement and/or a disengagement of one or more clutches.

BACKGROUND

Vehicle transmissions that employ more than one gearing ratio between an input and an output, may transition between various gear ratios by engaging and disengaging various clutches. The clutches may comprise alternating friction plates and separator plates that are configured to selectively couple two rotating elements (shafts, gears, etc.).

SUMMARY

A vehicle includes a transmission and a controller. The transmission has clutches that are configured to establish multiple speed ratios, including a first clutch. The first clutch has a measured drag torque distribution. The measured drag torque distribution has a median and a standard deviation. The controller is programmed to increase a pressure at a rate to engage the first clutch and to increase the rate in response to a measured first clutch torque exceeding the median by a predetermined multiple of the standard deviation.

A vehicle transmission includes an oncoming clutch and a controller. The oncoming clutch has a measured fluctuating torque when disengaged. The fluctuating torque has a non-zero median value and a standard deviation. The controller is programmed to, in response to a torque of the oncoming clutch increasing at a first rate during an engagement and surpassing the non-zero median value by a multiple of the standard deviation, increase the torque at a second rate that is greater than the first rate.

A method includes providing an oncoming clutch for a vehicle transmission, the oncoming clutch having a measured fluctuating disengaged torque that has a median value and a standard deviation, and increasing a rate at which torque of the oncoming clutch increases during an engagement in response to the torque of the oncoming clutch surpassing the median value by predetermined a multiple of the standard deviation.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
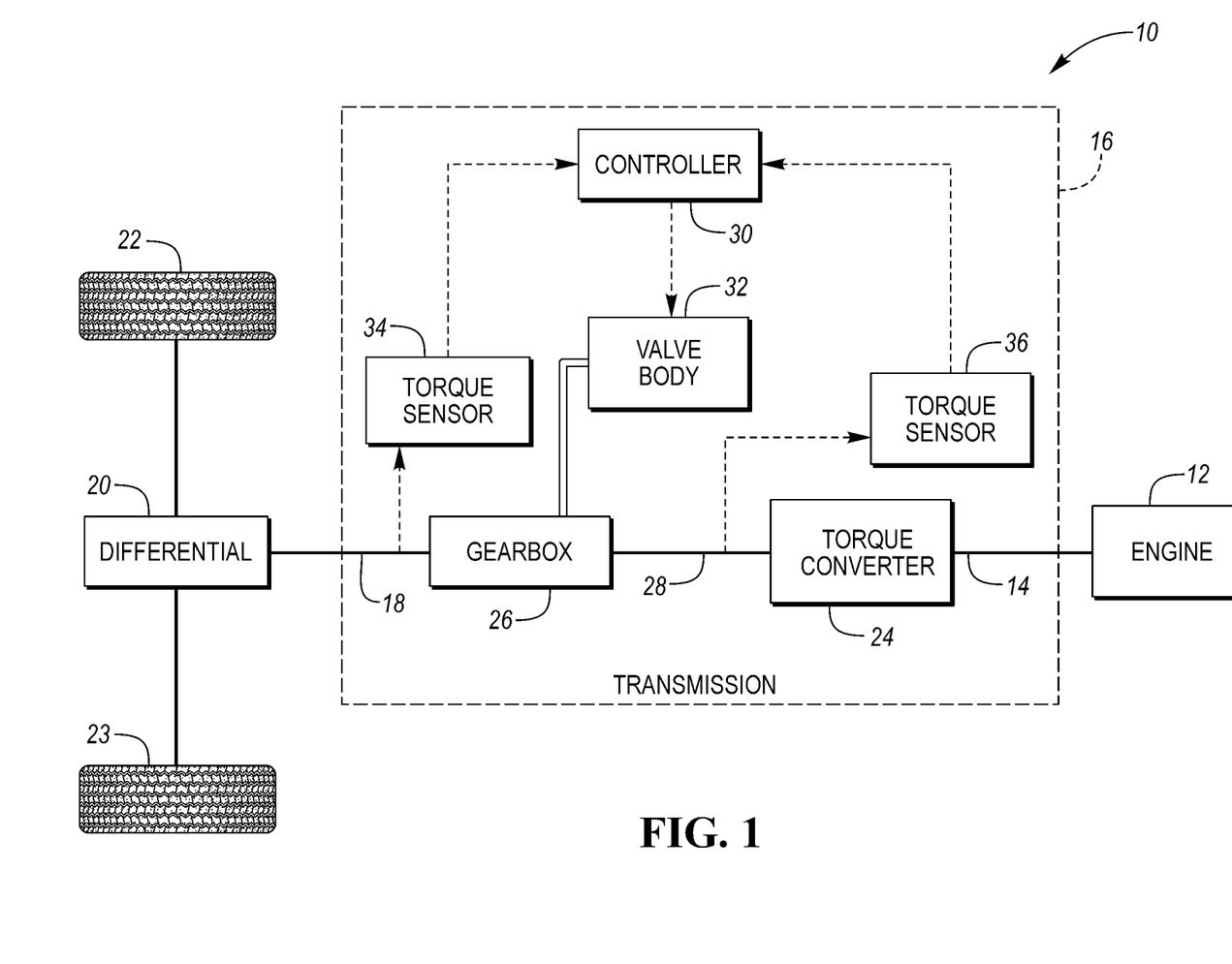
FIG. 1 is a schematic illustration of an exemplary vehicle and an exemplary vehicle powertrain.

A powertrain of a vehicle 10 is illustrated schematically in FIG. 1. Solid lines indicate mechanical connections. Broken lines represent the flow of signals. Double lines represent the flow of fluid. An engine 12 provides power to rotate a crankshaft 14. A transmission 16 transits the power from the crankshaft 14 to a driveshaft 18 while potentially modifying the speed and torque to be more suitable to the present vehicle requirements. A differential 20 distributes the power to a left wheel 22 and a right wheel 23 while permitting slight speed differences between the wheels such as when the vehicle 10 turns a corner.

The transmission includes a torque converter 24 and a gearbox 26. The torque converter 24 is a fluid coupling device that includes an impeller, stator, and turbine. The torque converter 24 transmits the power from the crankshaft 14 to a turbine shaft 28. The crankshaft 14 may be coupled to the impeller of the torque converter 24. The gearbox 26 transmits the power from the turbine shaft 28 to the driveshaft (or output shaft) 18. A controller 30 sends signals to a valve body 32 causing the valve body 32 to send pressurized fluid to clutches in the gearbox 26. The gear ratio of the gearbox 26 depends upon which subset of the clutches are provided with pressurized fluid. The controller 30 utilizes many inputs to determine what commands to send to valve body 32 including signals from an output torque sensor 34 and a turbine torque sensor 36. Additionally, the transmission 16 may include several speed sensors that may be utilized to determine the slip across all the internal clutches in the gearbox 26. The speed sensors may be located at the input of the transmission 16, at the output of the transmission 16, and at least two intermediate positions within the gearbox 26 of the transmission 16. The input of the transmission may refer to the crankshaft 14, the impeller of the torque converter 24, or the turbine (i.e., turbine shaft 28) of the torque converter 24. The output of the transmission 16 may refer to the driveshaft 18.

While illustrated as one controller, the controller 30 may be part of a larger control system and may be controlled by various other controllers throughout the vehicle 10, such as a vehicle system controller (VSC). It should therefore be understood that the controller 30 and one or more other controllers can collectively be referred to as a "controller" that controls various actuators in response to signals from various sensors to control functions the vehicle 10 or vehicle subsystems. The controller 30 may include a microprocessor or central processing unit (CPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 30 in controlling the vehicle 10 or vehicle subsystems.

Control logic or functions performed by the controller 30 may be represented by flow charts or similar diagrams in one or more figures. These figures provide representative control strategies and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed depending upon the particular processing strategy being used. Similarly, the order of processing is not necessarily required to achieve the features and advantages described herein, but is provided for ease of illustration and description. The control logic may be implemented primarily in software executed by a microprocessor-based vehicle, engine, and/or powertrain controller, such as controller 30. Of course, the control logic may be implemented in software, hardware, or a combination of software and hardware in one or more controllers depending upon the particular application. When implemented in software, the control logic may be provided in one or more computer-readable storage devices or media having stored data representing code or instructions executed by a computer to control the vehicle or its subsystems. The computer-readable storage devices or media may include one or more of a number of known physical devices which utilize electric, magnetic, and/or optical storage to keep executable instructions and associated calibration information, operating variables, and the like.

The controller 30 may be configured to receive various states or conditions of the various vehicle components illustrated in FIG. 1 via electrical signals. The electrical signals may be delivered to the controller 30 from the various components via input channels. Additionally, the electrical signals received from the various components may be indicative of a request or a command to change or alter a state of one or more of the respective components of the vehicle 10. The controller 30 includes output channels that are configured to deliver requests or commands (via electrical signals) to the various vehicle components. The controller 30 includes control logic and/or algorithms that are configured to generate the requests or commands delivered through the output channels based on the requests, commands, conditions, or states of the various vehicle components.

The input channels and output channels are illustrated as dotted lines in FIG. 1. It should be understood that a single dotted line may be representative of both an input channel and an output channel into or out of a single element. Furthermore, an output channel out of one element may operate as an input channel to another element and vice versa.

Figure 2:
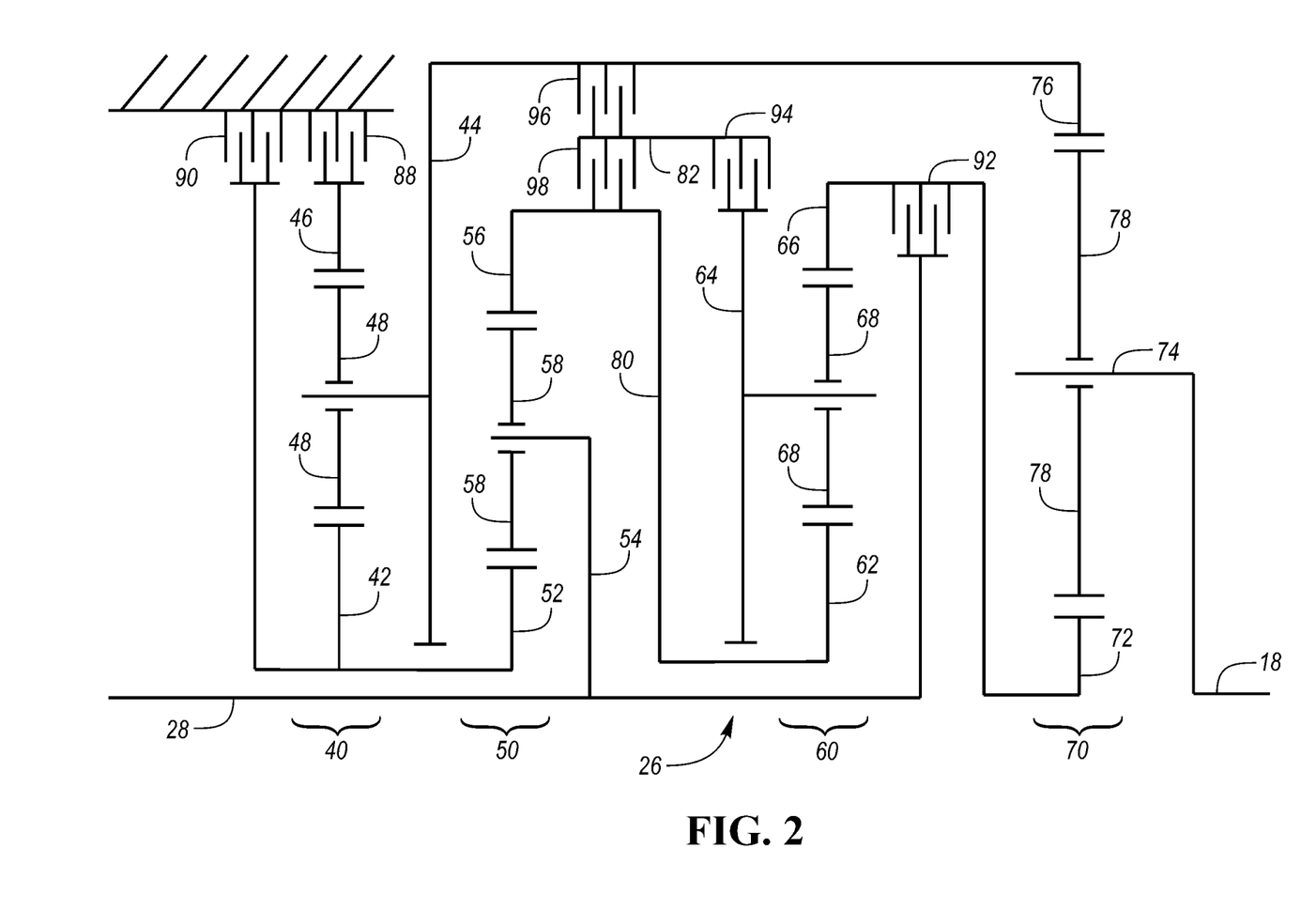
FIG. 2 is a schematic diagram of an exemplary transmission gearing arrangement.

An example gearbox is schematically illustrated in FIG. 2. The gearbox may also be referred to as a gearing arrangement. A gearing arrangement is a collection of rotating elements and clutches configured to impose specified speed relationships among elements. Some speed relationships, called fixed speed relationships, are imposed regardless of the state of any clutches. A gearing arrangement imposing only fixed relationships is called a fixed gearing arrangement. Other speed relationships are imposed only when particular clutches are fully engaged. A gearing arrangement that selectively imposes speed relationships is called a shiftable gearing arrangement. A discrete ratio transmission has a shiftable gearing arrangement that selectively imposes a variety of speed ratios between an input shaft and an output shaft.

A group of elements are fixedly coupled to one another if they are constrained to rotate as a unit in all operating conditions. Elements can be fixedly coupled by spline connections, welding, press fitting, machining from a common solid, or other means. Slight variations in rotational displacement between fixedly coupled elements can occur such as displacement due to lash or shaft compliance. In contrast, two elements are selectively coupled by a clutch when the clutch constrains them to rotate as a unit whenever the clutch is fully engaged and they are free to rotate at distinct speeds in at least some other operating condition. Clutches include actively controlled devices such as hydraulically or electrically actuated clutches and passive devices such as one way clutches. A clutch that holds an element against rotation by selectively connecting the element to a fixed component, such as a transmission housing, may be called a brake.

It should be noted that the proposed method is applicable to a wide variety of gearbox arrangements and should not be limited to the gearbox in FIG. 2. The gearbox utilizes four simple planetary gear sets 40, 50, 60, and 70. Sun gear 42 is fixed to sun gear 52, carrier 44 is fixed to ring gear 76, ring gear 56 is fixed to sun gear 62 by shaft 80, ring gear 66 is fixed to sun gear 72, turbine shaft 28 is fixed to carrier 54, and driveshaft 18 is fixed to carrier 74. Ring gear 46 is selectively held against rotation by brake 88 and sun gears 42 and 52 are selectively held against rotation by brake 90. Turbine shaft 28 is selectively coupled to ring gear 66 and sun gear 72 by clutch 92. Intermediate element 82 is selectively coupled to carrier 64 by clutch 94, selectively coupled to carrier 44 and ring gear 76 by clutch 96, and selectively coupled to shaft 80 by clutch 98.

As shown in Table 1, engaging the clutches and brakes in combinations of four establishes ten forward speed ratios and one reverse speed ratio between turbine shaft 28 and driveshaft 18. An X indicates that the corresponding clutch is engaged to establish the speed ratio.

TABLE 1

|      | 88 | 90 | 92 | 94 | 96 | 98 | Ratio | Step |
|------|----|----|----|----|----|----|-------|------|
| Rev  | X  | X  |    | X  | X  |    | -4.79 | 102% |
| $1^{st}$  | X  | X  | X  | X  |    |    | 4.70  |      |
| $2^{nd}$  | X  | X  |    | X  |    | X  | 2.99  | 1.57 |
| $3^{rd}$  | X  |    | X  | X  |    | X  | 2.18  | 1.37 |
| $4^{th}$  | X  |    |    | X  | X  | X  | 1.80  | 1.21 |
| $5^{th}$  | X  |    | X  |    | X  | X  | 1.54  | 1.17 |
| $6^{th}$  | X  |    |    | X  | X  | X  | 1.29  | 1.19 |
| $7^{th}$  |    |    | X  | X  | X  | X  | 1.00  | 1.29 |
| $8^{th}$  |    | X  | X  | X  | X  |    | 0.85  | 1.17 |
| $9^{th}$  |    | X  | X  |    | X  | X  | 0.69  | 1.24 |
| $10^{th}$ |    | X  |    | X  | X  | X  | 0.64  | 1.08 |

All single step and two step shifts are performed by gradually engaging one clutch, called an oncoming element, while gradually releasing a different clutch, called the off-going element. During each of these shifts, three clutches, called holding elements, are maintained fully engaged while one element is maintained fully disengaged. In other gearbox arrangements, the number of holding elements may be different.

Figure 3:
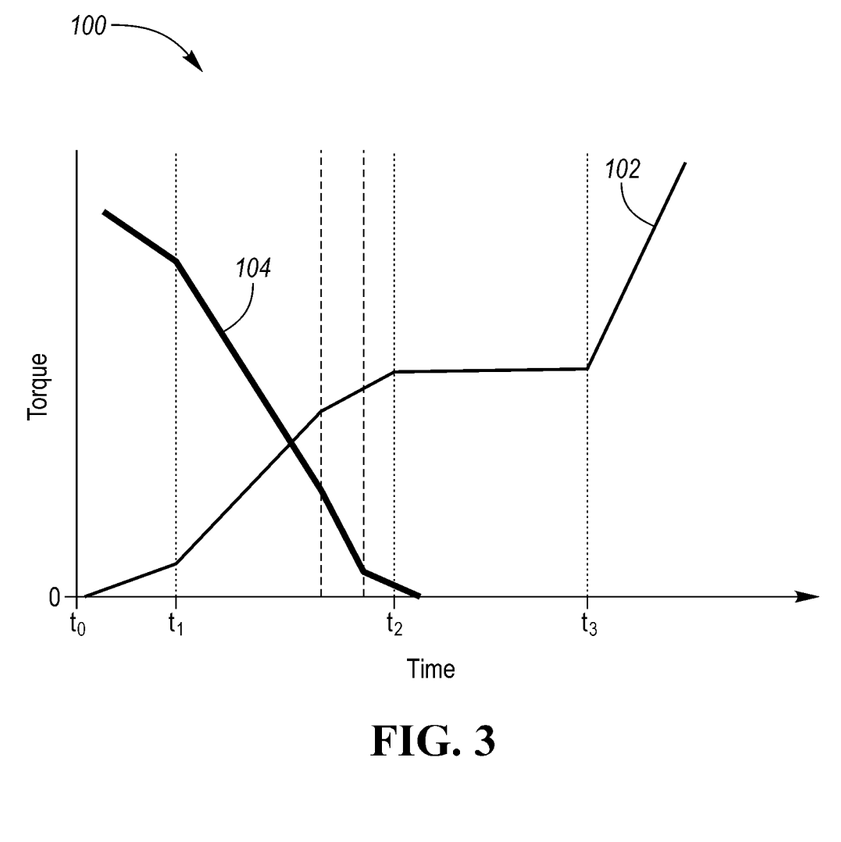
FIG. 3 is a simplified graph illustrating the torque of an oncoming clutch and the torque of an off-going clutch.

Referring to FIG. 3, a simplified graph 100 of the torque of an oncoming clutch and the torque of an off-going clutch is illustrated. The torque of the oncoming clutch is represented by line 102 and the torque of the off-going clutch is represented by line 104. The oncoming clutch and the off-going clutch may refer to any of the clutches or brakes in the transmission 16. More specifically, the oncoming clutch and the off-going clutch may refer to any of the clutches or brakes in the gearbox 26 of the transmission 16.

Between times $t_0$ time $t_1$, the torque of the oncoming clutch begins to ramp up while the torque of the off-going clutch begins to ramp down. This is known as the prep phase of a shift in a transmission. The torque of the oncoming clutch is ramped up at a decreased rate while the torque of the off-going clutch is ramped down at a decreased rate during the prep phase. Once it is determined that the oncoming clutch has reached an engagement state where it is considered to have sufficient capacity to transmit torque, the torque of the oncoming clutch is ramped up at an increased rate while the torque of the off-going clutch is ramped down at an increased rate between times $t_1$ and $t_2$ (please note that an increased rate at which the torque of the off-going clutch is ramped down refers to the rate becoming more negative in value). This is known as the torque phase of a shift in a transmission. The oncoming clutch may be considered to have reached an engagement state where it is considered to have sufficient capacity to transmit torque based on there being sufficient engagement between opposing sides of the oncoming clutch. Traditional methods of determining that oncoming clutch has sufficient capacity include the passage of a predetermined period of time lapsing from the start of the shift at time $t_0$.

Toward the end of the torque phase at time $t_2$, the torque of the off-going clutch is ramped to a defined value, typically zero, while the torque of the oncoming clutch begins to level out in preparation of the inertia phase that occurs between times $t_2$ and $t_3$. During the inertia phase, various components of the transmission 16 that were connected to the power flow of the transmission 16 during the shift are brought up to speed. This may cause disturbances or oscillations within the torque of the oncoming clutch, which are not depicted in FIG. 3. Once the inertia phase is completed at time $t_3$ and the various components of the transmission 16 that were connected to the power flow of the transmission 16 are brought up to speed, the torque of the oncoming clutch may then be ramped up to any desirable level that is within the operating parameters of the oncoming clutch.

Clutch engagement and disengagement may occur during an upshift of the transmission 16, a downshift of the transmission 16, a transition of the transmission 16 from a neutral mode into a mode that transmits power to an output of the transmission 16, or a transition of the transmission 16 from a parked mode into a mode that transmits power to an output of the transmission. A mode that transmits power to an output (e.g., driveshaft 18) of the transmission 16 may include a drive mode (D), reverse mode (R), Sport mode (S), Low gear mode (L), or any other mode where power is transmitted to the output of the transmission 16. A neutral mode (N) may include any mode where no power is transmitted to the output of the transmission 16. A parked mode (P) may also include a mode where the transmission gearing is locked and no power is transmitted to the output of the transmission 16. The transmission 16 may include a gear selector that allows a user to transition between the various modes PRNDSL.

A neutral mode may be the result of selecting neutral (N) on the gear selector or may be the result of a disengagement of an addition clutch inside the gearbox resulting in at least one less clutch (or brake) engaged than the number of clutches required to establish a connection between the input and the output of the transmission. For example, if three or less clutches (or brakes) are engaged in the gearbox 26 depicted in FIG. 2, no power will be transmitted to the driveshaft 18. Neutral modes may be present, when not selected via the gear selector of the transmission 16, for various reasons. For example, the transmission 16 may be commanded to transition to a neutral mode via the controller 30 during coasting operations where the operator releases an accelerator pedal of the vehicle 10 while the vehicle 10 is moving without applying a brake pedal of the vehicle 10.

Figure 4:
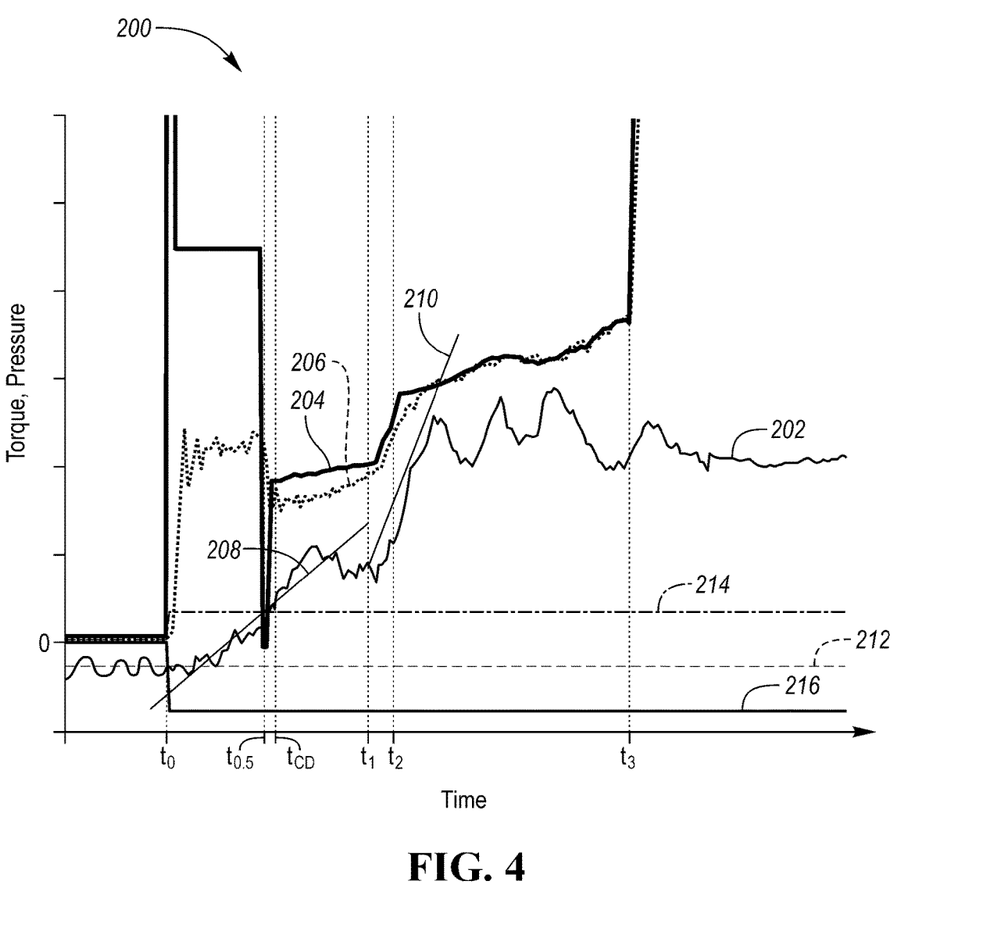
FIG. 4 is a graph illustrating torque and pressure of an oncoming clutch.

Referring to FIG. 4, a graph 200 of the torque and pressure of an oncoming clutch is illustrated. The graph 200 depicted in FIG. 4 illustrates addition complexities of the torque of the oncoming clutch that were omitted in the graph 100 depicted in FIG. 3. The oncoming clutch may refer to any of the clutches or brakes in the transmission 16. More specifically, the oncoming clutch may refer to any of the clutches or brakes in the gearbox 26 of the transmission 16. The prep phase of the oncoming clutch is illustrated between times $t_0$ and $t_1$, the torque phase of the oncoming clutch is illustrated between times $t_1$ and $t_2$, and inertia phase is illustrated between times $t_2$ and $t_3$. After time $t_3$, the torque of the oncoming clutch may then be ramped up to any desirable level that is within the operating parameters of the oncoming clutch. A measured torque of the oncoming clutch is represented by line 202, a commanded pressure to an actuator that engages the oncoming clutch is represented by line 204, and a measured pressure of the actuator that engages the oncoming clutch is represented by line 206.

The measured torque 202 of the oncoming clutch may be measured by a sensor that is directly connected to the oncoming clutch. Furthermore, each clutch in the gearbox 26 may have a respective sensor that measures the torque of the specific clutch. Alternatively, the torque of the oncoming clutch may be obtained based on measurements taken at various locations throughout the powertrain of the vehicle 10. For example, the torque of the oncoming clutch may be based on a model, equation, lookup table, map, or function that is stored as control logic within the controller 30 that includes one or more of the following variables as inputs: a measured input torque to the torque converter 24, a measured input torque to the gearbox 26, a measured output torque of the gearbox 26, an input acceleration of the torque converter 24, an input acceleration of the gearbox 26, an output acceleration of the gearbox 26, a measured output torque of the engine 12, characteristics of the torque converter (e.g., K factor), which clutches in the gearbox 26 are currently engaged, temperature of transmission fluid, and which clutches in the gearbox are currently disengaged.

This model may be used to calculate the torques of all the clutches within the gearbox 26. This would allow the controller 30 to know the torques for each potential pair of oncoming and off-going clutches in advance of an engagement or a shift, allowing the controller 30 to be prepared for all potential engagements and shifts. For example, the gearbox 26 depicted in FIG. 2 requires that four clutches be engaged and two clutches be disengaged to establish a power flow through the gearbox 26. During a shift, one of the four engaged clutches will be disengaged while one of the two disengaged clutches will be engaged. This will include eight potential pairs of one oncoming clutch and one off-going clutch.

The actuator may be a hydraulic cylinder that engages and forces alternating friction plates and separator plates of the oncoming clutch into contact with each other in order to engage the oncoming clutch. The pressures depicted in line 204 and line 206 may refer to the pressure of the hydraulic fluid that forces the hydraulic cylinder into engagement with the friction plates and separator plates of the oncoming clutch. Alternatively, the actuator that engages the oncoming clutch may be any other type of actuator known in the art such as pneumatic cylinders, electric motors, electric solenoids, etc.

During the prep phase of the engagement of the oncoming clutch between times $t_0$ and $t_{0.5}$, the commanded pressure to the actuator 204 and the measured pressure of the actuator 206 are increased substantially in response to a command form the controller 30 to engage the oncoming clutch. The pressure values during this period are high relative to the torque of the oncoming clutch because there is little or no engagement between the opposing sides of the clutch (i.e., the friction plates and separator plates). During this period, the oncoming clutch is advanced until it reaches the kiss point (i.e., the point where there is first contact between the opposing sides of the clutch). Once it is determined that the oncoming clutch has begun to engage at time $t_{0.5}$, the measured pressure of the actuator 206 is slightly decreased (this occurs during an unlatching the actuator or hydraulic value that operates the actuator, the sudden drop and recovery of the commanded pressure to the actuator 204 does not reflect a real world drop of measured pressure of the actuator 206), until the end of the prep phase at time $t_1$. Also during the prep phase, between times $t_0$ and $t_1$, the torque 202 of the oncoming clutch increases at approximately a first rate, represented by the slope of line 208.

Once it is determined that the oncoming clutch has reached an engagement state where it is considered to have sufficient capacity to transmit torque, the engagement of the oncoming clutch enters the torque phase, between times $t_1$ and $t_2$. During the torque phase, the commanded pressure to the actuator 204 and the measured pressure of the actuator 206 are increased at a second rate, which is greater than the first rate at which the pressures 204, 206 increase between times $t_{0.5}$ and $t_1$ (ignoring the initial drastic drop in the commanded pressure to the actuator 204). The second rate at which the commanded pressure to the actuator 204 and the measured pressure of the actuator 206 are increased is approximately represented by the slope of 204 between times $t_1$ and $t_2$. Also during the torque phase, the torque 202 of the oncoming clutch increases at approximately a second rate, which is greater than the first rate at which the torque 202 of the oncoming clutch increases between times $t_0$ and $t_1$. The second rate at which the torque 202 of the oncoming clutch approximately increases during the torque phase between times $t_1$ and $t_2$ is represented by the slope of line 210. After the torque phase and during the inertia phase between times $t_2$ and $t_3$, the commanded pressure to the actuator 204 and the measured pressure of the actuator 206 continue to increase, but at a lower rate when compared to the torque phase between times $t_1$ and $t_2$. The torque 202 of the oncoming clutch during the inertia phase, between times $t_2$ and $t_3$, fluctuates due to the various components of the transmission 16 being connected to the power flow of the transmission 16 and brought up to speed, which is a result of the engagement of the oncoming clutch. When the inertia phase ends at time $t_3$, the commanded pressure to the actuator 204 and the measured pressure of the actuator 206 are increased up to a maximum or nearly maximum pressure to maintain full engagement of the oncoming clutch, while the torque 202 of the oncoming clutch levels out a desired value.

The measured torque 202 of the oncoming clutch may have a fluctuating torque value when disengaged. The measured fluctuating disengaged torque may be observed on graph 200 prior to time $t_0$ and during a short period after time $t_0$. The measured fluctuating disengaged torque may be a drag torque or in part may include errors or uncertainties in a measured input torque to the torque converter 24, a measured input torque to the gearbox 26, a measured output torque of the gearbox 26, an input acceleration of the torque converter 24, an input acceleration of the gearbox 26, an output acceleration of the gearbox 26, etc. The measured fluctuating disengaged torque may be recorded continuously or at intervals by the controller 30. More specifically, the fluctuating disengage torque may be recorded during time windows that occur just before time $t_0$, that straddle time $t_0$, or that occur just after time $t_0$, but before the clutch is triggered to ramp up the torque at time $t_{cd}$ (see below). The recorded values of the measured fluctuating disengaged torque result in a statistical distribution of the measured fluctuating disengaged torque that includes a median, represented by line 212, and a standard deviation. When calculating the median and the standard deviation, errors or uncertainties in a measured input torque to the torque converter 24, a measured input torque to the gearbox 26, a measured output torque of the gearbox 26, an input acceleration of the torque converter 24, an input acceleration of the gearbox 26, an output acceleration of the gearbox 26, and/or other errors (e.g., errors in sensor readings, calculations, and/or coefficient values) may also be taken into account. The median and standard deviation of the measured fluctuating torque may be derived by a normal (or Gaussian) probability distribution or any other statistical probability distribution known in the art. The median may have a non-zero value. More specifically, the median value may have a non-zero value since the torque of a disengaged clutch is likely a drag torque.

Predetermined multiples of the standard deviation of the measured fluctuating disengaged torque may be utilized as an upper bound, represented by line 214, and/or a lower bound, represented by line 216. The upper bound may range anywhere between one and six standard deviations, while lower bound may range anywhere between negative one and negative six standard deviations. The upper bound 214 and the lower bound 216 may each be utilized by the controller 30 as triggering events to control certain aspects of an oncoming clutch, an off-going clutch, or some other component within the powertrain of the vehicle 10. For example, if the torque of any clutch in the transmission 16 falls below the lower bound 216, the controller 30 may be configured to issue a notification that the transmission is operating in an error state. A change in the median value 212 of the statistical distribution of the measured fluctuating disengaged torque may also be used as triggering event for issuing a notification that the transmission is operating in an error state. The notification may be issued to an operator of the vehicle via a visual device (e.g., a control panel light), an audio device (e.g., a speaker), or a haptic device (e.g., vibrating motors in the vehicle seat or steering wheel).

The upper bound 214 may be utilized as a trigger for determining if an oncoming clutch in the transmission 16 has reached the engagement state where it is considered to have sufficient capacity to transmit torque. Utilizing the upper bound 214 as a capacity detection trigger for an oncoming clutch may result in shortening or eliminating the period of time between $t_{0.5}$ and $t_1$, where the commanded pressure to the actuator 204, the measured pressure of the actuator 206, and the torque 202 of the oncoming clutch are all increased at lower rates when compared the rates of increase during the torque phase between times $t_1$ and $t_2$. Once sufficient capacity of the oncoming clutch has been detected, the controller 30 may command the actuator of the oncoming clutch to immediately jump to the torque phase where the commanded pressure to the actuator 204, the measured pressure of the actuator 206, and the torque 202 of the oncoming clutch are all increased at greater rates when compared the rates of increase during the prep phase between times $t_{0.5}$ and $t_1$. For example, in graph 200 when the torque 202 of the oncoming clutch surpasses the upper bound 214 at time $t_{cd}$, which is after time $t_{0.5}$ but prior to $t_1$, the controller 30 may adjust the commanded pressure to the actuator 204 at time $t_{cd}$ such that commanded pressure to the actuator 204, the measured pressure of the actuator 206, and the torque 202 of the oncoming clutch all start to the increase at the increased rates that occur during the torque phase between times $t_1$ and $t_2$. This adjustment will effectively allow the oncoming clutch to jump to the torque phase resulting in a shorter time period for the oncoming clutch to obtain full engagement, which in results in better fuel economy by reducing the energy absorbed by the clutch.

Figure 5:
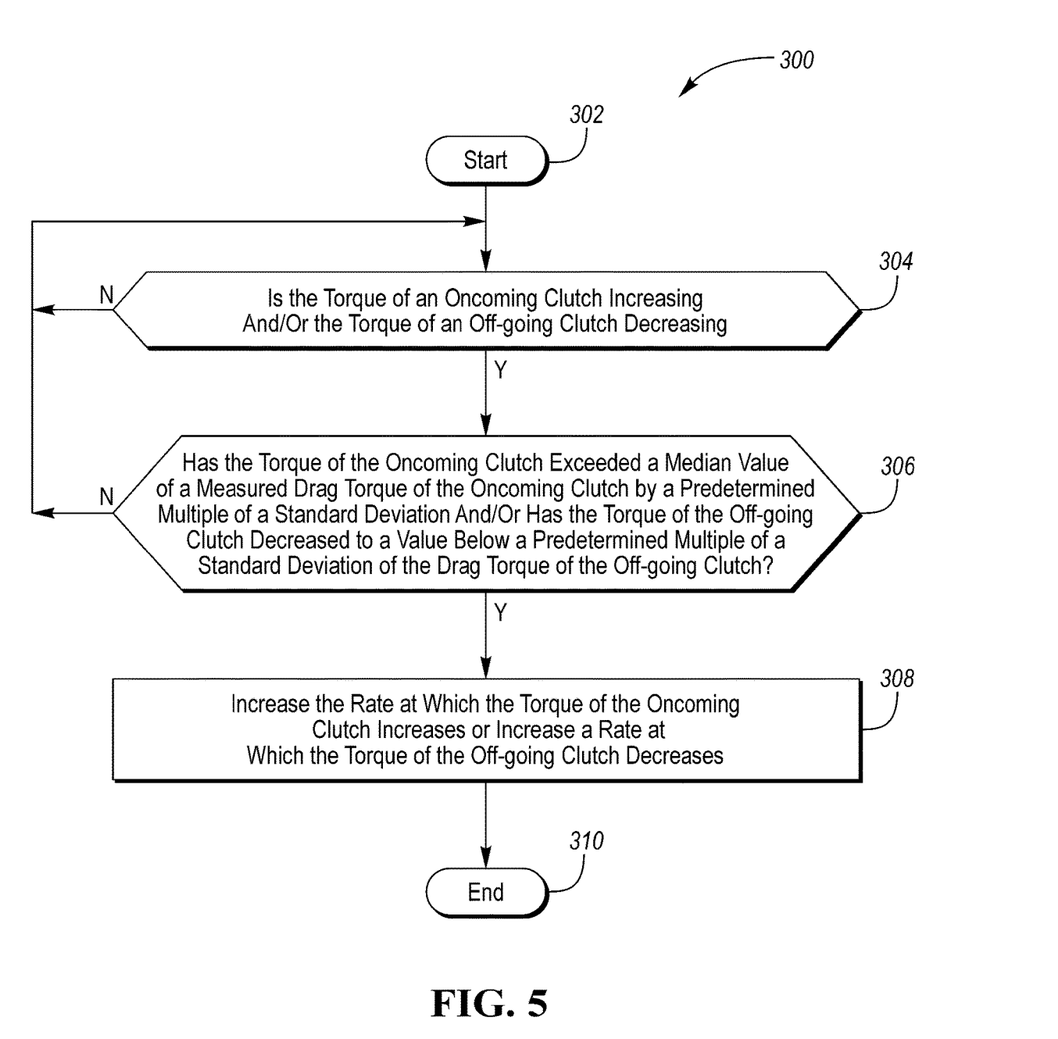
FIG. 5 is a flowchart depicting a method for controlling an oncoming clutch and/or and off-going clutch.

Referring to FIG. 5, a flowchart depicting a method 300 for controlling an oncoming clutch and/or and off-going clutch is illustrated. The steps of the method 300 may be stored as algorithms and/or control logic within the controller 30. The controller 30 may be configured to implement the method 300 based on various conditions or states of the vehicle 10 that are communicated to the controller 30. The method 300 is initiated it start block 302. Next, the method 300 moves on to block 304 where it is determined if the torque of an oncoming clutch is increasing and/or the torque of an off-going clutch is decreasing. Alternatively at block 304, it may be determined if the command pressure of an actuator of an oncoming clutch is increasing or the command pressure of an off-going clutch is decreasing. The controller 30 may command the torque of an oncoming clutch (or the pressure of an actuator thereof) to increase for engagement purposes or may command the torque of an off-going clutch (or the pressure of an actuator thereof) to decrease for disengagement purposes. The initial torque of an oncoming clutch (or the pressure of an actuator thereof) or the initial torque off-going clutch (or the pressure of an actuator thereof) may be respectively commanded to increase and decrease at initial rates. If neither the torque of an oncoming clutch is increasing nor the torque of an off-going clutch is decreasing, the method 300 returns to the beginning of block 304. If the torque of an oncoming clutch is increasing and/or the torque of an off-going clutch is decreasing, the method moves on to block 306.

At block 306, it is determined if the torque of an oncoming clutch has exceeded the median value 212 of the statistical distribution of the measured fluctuating disengaged torque of the oncoming clutch by a predetermined multiple of the standard deviation of the measured fluctuating disengaged torque (which may be represented by the upper bound 214 in FIG. 4) and/or if the torque of an off-going clutch has decreased to a value below a predetermined multiple of the standard deviation of the measured fluctuating disengaged torque of the off-going clutch (which may also be represented by the upper bound 214 in FIG. 4). It should be noted that the statistical distribution shown in FIG. 4, including the upper bound 214, lower bound 216, and median 212 are meant for representative purposes only. The values of the statistical distribution will likely have different values for each clutch within the gearbox 26 of the transmission 16. For example, although it is stated that the upper bound 214 may be considered a predetermined multiple of the standard deviation of the measured fluctuating disengaged torque of both an oncoming clutch and an off-going clutch, the actual values will likely be different for each of a pair of clutches involved in a single shift within the gearbox 26 where one clutch is oncoming and the other off-going. Furthermore, the statistical distribution may be representative of prior relative engagements or disengagements of the clutch for a similar event which may also include similar temperatures of the transmission fluid during the event. For example, the statistical distribution may be representative of a downshift, upshift, shift out of neutral, etc. for a given temperature range.

If the torque of an oncoming clutch has not exceeded the median value 212 of the statistical distribution of the measured fluctuating disengaged torque of the oncoming clutch by a predetermined multiple of the standard deviation 214 and/or the torque of an off-going clutch has not decreased to a value below a predetermined multiple of the standard deviation 214 of the statistical distribution of the measured fluctuating disengaged torque of the off-going clutch, the method returns to the beginning of block 304. If the torque of an oncoming clutch has exceeded the median value 212 of the statistical distribution of the measured fluctuating disengaged torque of the oncoming clutch by a predetermined multiple of the standard deviation 214 and/or the torque of an off-going clutch has decreased to a value below a predetermined multiple of the standard deviation 214 of the statistical distribution of the measured fluctuating disengaged torque of the off-going clutch, the method 300 moves on to block 308.

At block 308, if the torque of an oncoming clutch has exceeded the median value 212 of the statistical distribution of the measured fluctuating disengaged torque of the oncoming clutch by a predetermined multiple of the standard deviation 214, the rate at which the torque of the oncoming clutch is increasing is increased (and the rate at which the pressure of an actuator thereof is increasing is increased). This coincides with the increase in the rate of increase of the torque of the oncoming clutch and the increase in the rate of increase of the pressure of the actuator that occurs at time $t_1$ in FIGS. 3 and 4. Also at block 308, if the torque of an off-going clutch has decreased to a value below a predetermined multiple of the standard deviation 214 of the statistical distribution of the measured fluctuating disengaged torque of the off-going clutch, the rate at which the torque of the off-going clutch is decreasing is increased (and the rate at which the pressure of an actuator thereof is decreasing is increased). This coincides with the increase in the rate of decrease of the torque of the off-going clutch that occurs at time $t_1$ in FIG. 3. Again, please note that increase in the rate of decrease of the torque of the off-going clutch refers to the rate becoming more negative in value. After the steps in block 308 are complete, the method 300 ends at block 310.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a transmission having clutches configured to establish multiple speed ratios, including a first clutch having a measured drag torque distribution with a median and a standard deviation; and
   a controller programmed to increase a pressure at a rate to engage the first clutch and to increase the rate in response to a measured first clutch torque exceeding the median by a predetermined multiple of the standard deviation.

2. The vehicle of claim 1, wherein the multiple of the deviation ranges between two and four standard deviations of a normal distribution.

3. The vehicle of claim 1, wherein the median is non-zero.

4. The vehicle of claim 1, wherein the transmission includes a second clutch having a second measured drag torque distribution with a second median and a second standard deviation, and where the controller is further programmed to, decrease a pressure at a second rate to disengage the second clutch and to decrease the second rate in response to a measured second clutch torque decreasing below a predetermined multiple of the second standard deviation.

5. The vehicle of claim 1, wherein the engagement of the first clutch corresponds to an upshift of the transmission.

6. The vehicle of claim 1, wherein the engagement of the first clutch corresponds to a downshift of the transmission.

7. The vehicle of claim 1, wherein the engagement of the first clutch corresponds to a transition of the transmission from a neutral mode into a mode that transmits power to an output of the transmission.

8. The vehicle of claim 1, wherein the controller is further programmed to, in response to the measured first clutch torque decreasing below the median by the predetermined multiple of the standard deviation, issue a notification that the transmission is operating in an error state.

9. A vehicle transmission comprising:
   an oncoming clutch having a measured fluctuating torque when disengaged, the fluctuating torque having a non-zero median value and a standard deviation; and
   a controller programmed to, in response to a torque of the oncoming clutch increasing at a first rate during an engagement and surpassing the non-zero median value by a multiple of the standard deviation, increase the torque at a second rate that is greater than the first rate.

10. The transmission of claim 9, wherein the multiple of the standard deviation ranges between two and four standard deviations of a normal distribution.

11. The transmission of claim 9, further comprising an off-going clutch having a second fluctuating torque when disengaged, the second fluctuating torque having a second non-zero median value and a second standard deviation, and wherein the controller is further programmed to, in response to a torque of the off-going clutch during the engagement decreasing below a multiple of the second standard deviation, increase a rate at which the torque of the off-going clutch decreases.

12. The transmission of claim 9, wherein the engagement is an upshift of the transmission.

13. The transmission of claim 9, wherein the engagement is a downshift of the transmission.

14. The transmission of claim 9, wherein the engagement is a transition of the transmission from a neutral mode into a mode that transmits power to an output of the transmission.

15. The transmission of claim 9, wherein the engagement is a transition of the transmission from a neutral mode to a drive mode.

16. The transmission of claim 9, wherein the engagement is a transition of the transmission from a neutral mode to a reverse mode.

17. A method comprising:
   providing an oncoming clutch for a vehicle transmission, the oncoming clutch having a measured fluctuating disengaged torque that has a median value and a standard deviation; and
   increasing a rate at which torque of the oncoming clutch increases during an engagement in response to the torque of the oncoming clutch surpassing the median value by predetermined a multiple of the standard deviation.

18. The method of claim 17, wherein the multiple of the standard deviation ranges between two and four standard deviations of a normal distribution.

19. The method of claim 17, wherein the median value of the measured disengaged torque is non-zero.

20. The method of claim 17, further comprising the steps of:
   providing an off-going clutch for the vehicle transmission, the off-going clutch having a second measured fluctuating disengaged torque that has a second median value and a second standard deviation; and
   increasing a rate at which torque of the off-going clutch decreases during the engagement in response to the torque of the off-going clutch decreasing below a multiple of the second standard deviation.

* * * * *